United States Patent
Citrano, III et al.

(10) Patent No.: US 8,369,880 B2
(45) Date of Patent: Feb. 5, 2013

(54) JOIN KEY PROVISIONING OF WIRELESS DEVICES

(75) Inventors: Joseph Citrano, III, Eden Prairie, MN (US); Murray Frederic Freeman, Austin, TX (US); Jeffrey Dale Potter, Shorewood, MN (US); Daniel Clifford Carlson, St. Paul, MN (US); Robert John Karschnia, Chaska, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 449 days.

(21) Appl. No.: 12/394,394

(22) Filed: Feb. 27, 2009

(65) Prior Publication Data

US 2009/0296601 A1   Dec. 3, 2009

Related U.S. Application Data

(60) Provisional application No. 61/031,838, filed on Feb. 27, 2008.

(51) Int. Cl.
*H04B 7/00* (2006.01)

(52) U.S. Cl. .................. 455/507; 370/254

(58) Field of Classification Search .......... 455/507; 370/254
See application file for complete search history.

(56) References Cited

U.S. PATENT DOCUMENTS

| | | | | |
|---|---|---|---|---|
| 5,142,550 A * | 8/1992 | Tymes | ........................... | 375/141 |
| 5,400,246 A * | 3/1995 | Wilson et al. | ................... | 700/17 |
| 5,451,923 A * | 9/1995 | Seberger et al. | ............... | 375/257 |
| 5,513,245 A * | 4/1996 | Mizikovsky et al. | ......... | 455/411 |
| 5,666,530 A * | 9/1997 | Clark et al. | ........................... | 1/1 |
| 5,682,476 A * | 10/1997 | Tapperson et al. | ............ | 370/225 |
| 5,793,963 A * | 8/1998 | Tapperson et al. | ............ | 709/201 |
| 5,794,139 A * | 8/1998 | Mizikovsky et al. | ......... | 455/403 |
| 6,185,198 B1 * | 2/2001 | LaDue | ........................... | 370/329 |
| 6,195,751 B1 * | 2/2001 | Caronni et al. | ............... | 713/163 |
| 6,201,871 B1 * | 3/2001 | Bostley et al. | ............... | 380/249 |
| 6,236,334 B1 * | 5/2001 | Tapperson et al. | ............. | 700/21 |
| 6,889,166 B2 * | 5/2005 | Zielinski et al. | ............. | 702/183 |
| 6,925,419 B2 * | 8/2005 | Duren et al. | .................. | 702/184 |
| 6,973,508 B2 * | 12/2005 | Shepard et al. | .................. | 710/8 |
| 7,013,290 B2 * | 3/2006 | Ananian | .................... | 705/26.42 |
| 7,027,952 B2 * | 4/2006 | DelaCruz et al. | ............. | 702/183 |
| 7,036,386 B2 * | 5/2006 | Mathiowetz et al. | ........... | 73/856 |
| 7,039,744 B2 * | 5/2006 | Mathiowetz et al. | ......... | 710/305 |
| 7,110,833 B2 * | 9/2006 | Nagatsuka et al. | ............. | 700/17 |
| 7,175,073 B2 * | 2/2007 | Kelley et al. | .................. | 235/379 |
| 7,199,784 B2 * | 4/2007 | Mathiowetz et al. | ......... | 345/156 |
| 7,221,932 B2 * | 5/2007 | Ido | ................ | 455/411 |
| 7,228,128 B2 * | 6/2007 | Yoshimura | ................ | 455/422.1 |
| 7,262,693 B2 * | 8/2007 | Karschnia et al. | ............ | 340/508 |
| 7,269,463 B2 * | 9/2007 | Nagatsuka et al. | ............. | 700/17 |
| 7,305,459 B2 * | 12/2007 | Klemba et al. | ................ | 709/220 |

(Continued)

FOREIGN PATENT DOCUMENTS

WO    WO03023536 A1    3/2003

OTHER PUBLICATIONS

The International Search Report in counterpart foreign application No. PCT/US2009/001291 filed Feb. 27, 2009.

*Primary Examiner* — Hai Nguyen
(74) *Attorney, Agent, or Firm* — Kinney & Lange, P.A.

(57) ABSTRACT

Wireless devices are provisioned to join a wireless mesh network by writing an individual or common join key and network identification information to the wireless device, and creating an association of the wireless device with a gateway of the network by providing the gateway with a unique device identifier for the wireless device. The writing of the join key to the wireless device is achieved without revealing the join key to a user.

18 Claims, 7 Drawing Sheets

U.S. PATENT DOCUMENTS

| | | |
|---|---|---|
| 7,400,594 B2 * | 7/2008 | Pereira et al. .................. 370/310 |
| 7,421,411 B2 * | 9/2008 | Kontio et al. .................... 705/52 |
| 7,426,452 B2 * | 9/2008 | Zielinski et al. ............... 702/184 |
| 7,467,302 B2 * | 12/2008 | Kao et al. ....................... 713/183 |
| 7,522,731 B2 * | 4/2009 | Klemba et al. ................. 380/285 |
| 7,546,357 B2 * | 6/2009 | Manchester et al. ........... 709/220 |
| 7,561,694 B1 * | 7/2009 | Chakrabarti et al. ........... 380/270 |
| 7,565,539 B2 * | 7/2009 | Agarwal ........................ 713/171 |
| 7,580,528 B2 * | 8/2009 | Farley et al. ................... 380/270 |
| 7,581,099 B2 * | 8/2009 | Ong ................................ 713/170 |
| 7,634,731 B2 * | 12/2009 | Lee ................................ 715/706 |
| 7,647,036 B2 * | 1/2010 | Omae et al. .................... 455/411 |
| 7,720,460 B2 * | 5/2010 | Yoshimura ..................... 455/406 |
| 7,739,181 B2 * | 6/2010 | Breitenbach et al. ............ 705/37 |
| 7,809,953 B2 * | 10/2010 | Little et al. ..................... 713/184 |
| 7,813,762 B2 * | 10/2010 | Sanguino et al. .............. 455/557 |
| 7,925,010 B2 * | 4/2011 | Sannino et al. .................. 380/30 |
| 7,930,374 B2 * | 4/2011 | Manchester et al. ........... 709/220 |
| 7,945,959 B2 * | 5/2011 | Ilechko ............................ 726/26 |
| 7,953,728 B2 * | 5/2011 | Hu et al. ......................... 707/719 |
| 7,954,703 B2 * | 6/2011 | Miller et al. ................... 235/379 |
| 7,956,738 B2 * | 6/2011 | Karschnia et al. ............. 340/538 |
| 7,957,532 B2 * | 6/2011 | Chen et al. ..................... 380/270 |
| 7,958,542 B2 * | 6/2011 | Herrmann .......................... 726/4 |
| 7,973,657 B2 * | 7/2011 | Ayed ........................ 340/539.23 |
| 8,008,563 B1 * | 8/2011 | Hastings ........................ 84/479 A |
| 8,014,529 B2 * | 9/2011 | Koren et al. ................... 380/280 |
| 8,036,705 B2 * | 10/2011 | Jang et al. ...................... 455/558 |
| 8,037,541 B2 * | 10/2011 | Montague et al. ............... 726/28 |
| 8,050,409 B2 * | 11/2011 | Agrawal et al. ................ 380/278 |
| 8,051,470 B2 * | 11/2011 | Ong .................................. 726/6 |
| 8,055,910 B2 * | 11/2011 | Kocher et al. .................. 713/193 |
| 8,086,850 B2 * | 12/2011 | Ghosh ............................ 713/163 |
| 8,090,101 B2 * | 1/2012 | Ye et al. ........................... 380/47 |
| 8,208,635 B2 * | 6/2012 | Karschnia et al. ............. 380/270 |
| 8,223,970 B2 * | 7/2012 | Sannino et al. ................ 380/255 |
| 8,249,350 B2 * | 8/2012 | Voloshynovskyy et al. .. 382/181 |
| 2002/0065631 A1 | 5/2002 | Loechner |
| 2002/0078153 A1 * | 6/2002 | Chung et al. ................... 709/204 |
| 2002/0123359 A1 * | 9/2002 | Wei et al. ....................... 455/466 |
| 2002/0123907 A1 * | 9/2002 | Strayer .............................. 705/2 |
| 2002/0188575 A1 * | 12/2002 | Freeny, Jr. ....................... 705/72 |
| 2004/0073791 A1 * | 4/2004 | Vollmer et al. ................ 713/168 |
| 2004/0215687 A1 * | 10/2004 | Klemba et al. ................. 709/200 |
| 2004/0225740 A1 * | 11/2004 | Klemba et al. ................. 709/227 |
| 2004/0228490 A1 * | 11/2004 | Klemba et al. ................. 380/270 |
| 2005/0050004 A1 | 3/2005 | Sheu |
| 2006/0174121 A1 * | 8/2006 | Omae et al. .................... 713/172 |
| 2007/0016942 A1 * | 1/2007 | Sakai et al. ......................... 726/9 |
| 2007/0036353 A1 * | 2/2007 | Reznik et al. .................... 380/30 |
| 2007/0087756 A1 * | 4/2007 | Hoffberg ........................ 455/450 |
| 2007/0165845 A1 * | 7/2007 | Ye et al. ............................ 380/30 |
| 2007/0250713 A1 | 10/2007 | Rahman et al. |
| 2008/0002882 A1 * | 1/2008 | Voloshynovskyy et al. .. 382/181 |
| 2008/0016344 A1 | 1/2008 | Holden et al. |
| 2008/0082698 A1 * | 4/2008 | Schnaare ........................ 709/250 |
| 2008/0192622 A1 * | 8/2008 | Scheim et al. ................. 370/210 |
| 2008/0233966 A1 * | 9/2008 | Scheim et al. ............... 455/452.1 |
| 2008/0273486 A1 | 11/2008 | Pratt et al. |
| 2008/0273518 A1 * | 11/2008 | Pratt et al. ...................... 370/345 |
| 2008/0274766 A1 * | 11/2008 | Pratt et al. ................... 455/552.1 |
| 2008/0278145 A1 | 11/2008 | Wenger |
| 2008/0279155 A1 | 11/2008 | Pratt, Jr. et al. |
| 2008/0279204 A1 * | 11/2008 | Pratt et al. ...................... 370/406 |
| 2009/0010203 A1 * | 1/2009 | Pratt et al. ...................... 370/328 |
| 2009/0010204 A1 | 1/2009 | Pratt, Jr. et al. |
| 2009/0010205 A1 | 1/2009 | Pratt, Jr. et al. |
| 2009/0010233 A1 | 1/2009 | Pratt, Jr. et al. |
| 2009/0054033 A1 * | 2/2009 | Pratt et al. ...................... 455/410 |
| 2009/0086657 A1 * | 4/2009 | Alpert et al. ................... 370/310 |
| 2009/0296601 A1 * | 12/2009 | Citrano et al. ................. 370/254 |
| 2009/0307099 A1 * | 12/2009 | Tanik et al. ...................... 705/26 |
| 2010/0131751 A1 * | 5/2010 | Reznik et al. .................. 713/151 |
| 2011/0169654 A1 * | 7/2011 | Ketari ............................ 340/687 |

\* cited by examiner

JOIN KEY PROVISIONING OF WIRELESS DEVICES

CROSS-REFERENCE TO RELATED APPLICATION(S)

This application claims priority to U.S. Provisional Pat. App. No. 61/031,838; filed Feb. 27, 2008, which is hereby incorporated by reference in its entirety.

BACKGROUND

The present invention relates to devices that communicate over a wireless mesh network. In particular, the present invention relates to provisioning a wireless device to join a wireless mesh network.

Mesh networks use a process known as "joining" to incorporate new devices into the secured network. During the joining process, a number of information exchanges and configurations take place.

The new device uses a network predetermined channel to discover similar devices within radio range. These are the existing network nodes the new device has available to it in order to gain membership into the network. The presence of each device within range is recorded. The new device sends a message to establish a handshake protocol with a neighbor device, asks to join the network, and provides a device number and network ID. The neighbor communicates the request to a network manager, which for example may be a software program running on a network gateway or a server connected to the gateway. The new device will provide its "neighbor" list to the network manager so that the network manager can determine the links that must be established to allow the new device to participate in the network.

The new device receives a joining message from the network manager. The new device then sends back the expected response along with other information necessary for the network manager to establish links from the new device to other devices in the network.

The new device and its new parents and children receive and implement configuration information from the network manager to establish the required links. The new device is then fully joined and participating in the network.

For wireless mesh networks, communication security and ease of use are two important features. These two features can be at odds, because communication security implies complexity and an opportunity for things to go wrong.

In one approach used in wireless mesh networks, security is predicated on a symmetric join key mechanism. By loading the correct join key into a device, that device is then capable of communicating with its neighbors and the gateway of the mesh network in a secure way. In this approach, during the joining process, the message to the neighbor device is encrypted by the new device using its stored join key. If the new device has the wrong join key, the join request will be rejected by the neighbor and will not be sent on to the network manager. The new device also uses the join key to decode the joining message from the network manager. Other approaches to security are possible that do not require a symmetric join key mechanism. These other approaches make use of asymmetric or symmetric encryption keys or other cryptographic material stored in the devices to provide network security.

One challenge with wireless mesh networks is how to load cryptographic material (such as a join key or other symmetric or asymmetric keys) to the wireless device the first time. If the loading is done manually, human errors can occur. If the loading is done through wireless communication with the device, the communication is not secure, and another wireless device within range may be able to receive and possibly misuse the cryptographic material that was intended for the new device that is being loaded.

Join keys are long random strings and are clumsy to load manually. The task of loading join keys into wireless devices is complicated when there are many wireless devices to provision. The task of loading join keys is further complicated when individual join keys are used.

Both common join keys and individual join keys have been used in wireless mesh networks. A common join key works for all devices that want to join a particular network. An individual join key is used for only one wireless device to join a network. In other words, when individual join keys are used, each wireless device must be provided a different individual join key.

Documentation is another important facet when considering the use of a wireless mesh network. Procedures that have been used in the past for adding join keys to wireless devices, for join key number generation, and for generating the documentation relating to wireless devices under join keys has been fragmented and has required significant manual effort.

A typical process for providing a common join key to a wireless device so that it can join a network is as follows. First, a user retrieves the common join key from the wireless gateway. This may be done, for example, through a computer connected on a network to the gateway. The user then writes the join key down on a piece of paper and stores the paper with the written join key. Often, the paper and the join key are not maintained in a secure location. The user then makes use of a handheld device to load the join key into the wireless device. The user may document when the join key was loaded into a particular wireless device, and the time at which the loading took place. The user repeats these steps until all of the wireless devices to be added to the wireless mesh network have received the common join key.

This practice has several disadvantages. First, it exposes a common join key to many people within the facility. Second, the join key is often recorded on paper, and may be left unsecured for use the next time a wireless device is being added to the network. Third, documentation is handled manually. Therefore, it may be forgotten; it may not be part of the procedure being used to provision the wireless devices; and it may be prone to human error. Fourth, the process of provisioning the wireless devices is time consuming, particularly when there are a large number of wireless devices involved. Because errors can be made in entering the join key into the handheld device, rework may be necessary in order to get all of the wireless devices provisioned.

A typical process for a mesh network using individual join keys is as follows. A user will retrieve an individual join key from the wireless gateway and write the individual join key down on a piece of paper. The user subsequently uses a handheld device to load the join key into the wireless device. The user then goes back to the wireless gateway and retrieves the next individual join key. The user documents that an individual join key was loaded into a particular wireless device at a particular time. These steps are then repeated until all wireless devices are complete.

This practice improves security over the use of common join keys because once an individual join key is used, it is no longer valid. However, the process involves substantially more time because the user must go to the gateway after each device is commissioned. This may be inconvenient where the wireless devices that are being provisioned are located where access to a gateway interface is not readily available. Once again, documentation is handled manually, which means that it may be forgotten, not made part of a procedure, or may be subject to human error.

SUMMARY

Join key provisioning of wireless devices to allow them to join a wireless mesh network includes two basic steps. A physical connection is made to the wireless device to allow secure data communication. The wireless device and a particular gateway of the wireless mesh network are associated using the join key information and a unique device identifier.

DETAILED DESCRIPTION

Figure 1:
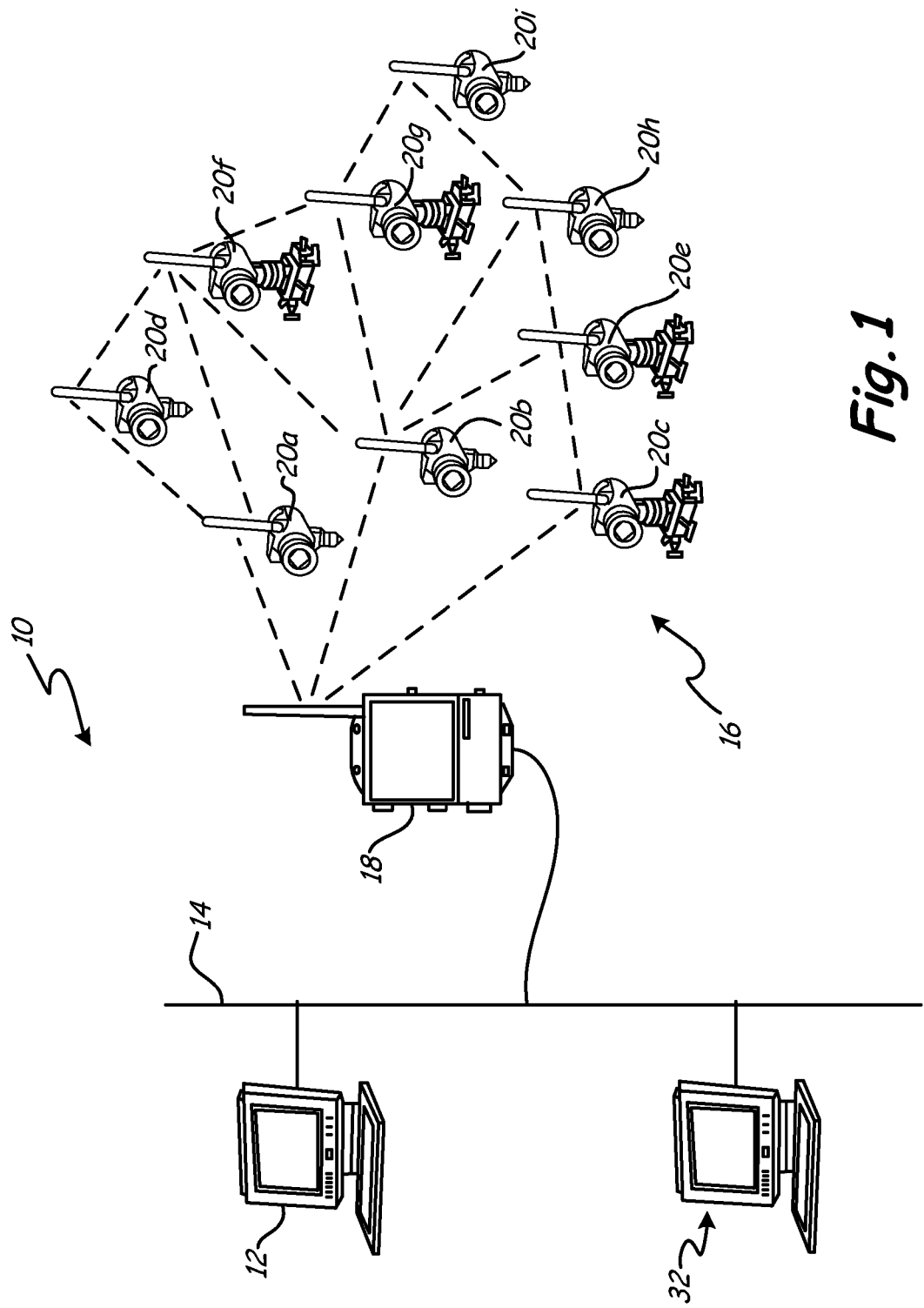
FIG. 1 is a diagram illustrating a process control/monitoring system in which a wireless mesh network routes messages between a host and field devices.

FIG. 1 shows process control/monitoring system 10, which includes host computer 12, high-speed network 14, wireless mesh network 16 (which includes gateway 18 and wireless field devices or nodes 20a-20i), configuration device 30, and network computer 32. Gateway 18 interfaces mesh network 16 with host computer 12 over high-speed network 14. Messages may be transmitted from host computer 12 to gateway 18 over network 14, and are then transmitted to a selected node of mesh network 16 over one of several different paths. Similarly, messages from individual nodes of mesh network 16 are routed through mesh network 16 from node-to-node over one of several paths until they arrive at gateway 18 and are then transmitted to host 12 over high-speed network 14. Wireless mesh network 16 represents one embodiment of mesh networks. In other embodiments, such as a star topology mesh network, each device node is connected to one of a plurality of gateway devices, although the devices are not connected to communicate with one another. Each of the plurality of gateway devices may be connected to one or more additional gateway devices to form a mesh network of gateway devices (i.e., the gateway devices themselves form the mesh network). In other embodiments, device nodes may be associated with one or more gateway devices in a redundant gateway topology. For the sake of simplicity however, the present invention is described with respect to the mesh network topology shown in FIG. 1, but could apply to other mesh network topologies known in the art.

New wireless field devices can be added to network 16 using a joining process. In one embodiment, security within network 16 is predicated on a symmetric join key mechanism. The correct join key must be loaded into a field device so that the device will be accepted by other field devices and by the gateway. The join key must be loaded in a secure fashion, so that another wireless device within range cannot receive and possibly misuse the join key. Although join keys can be loaded manually into each new field device, manual loading can be prone to errors and exposes cryptographic material to human operators.

The goal is to load cryptographic material such as keys into new field devices in a secure fashion. This may be achieved through a secure wired communication path to the new field device directly from gateway 18 from network computer 32, or from handheld communicator 70 (shown in FIGS. 3A-6D). Network computer 32 provides a graphical user interface (GUI) which may include, for example, a web browser. Configuration device 30 and the GUI on computer 32 allow a technician to interrogate the network security manager (which may be, for example, an application program running on gateway 18, host computer 12, server, or other network device), obtain the correct join key (or other cryptographic material) for the new field device, and securely load the join key into the new field device. Once the join key and other required information has been loaded, the new field device can be installed in the field, where it can use its stored join key as part of the joining process to become part of wireless network 16.

Host computer 12 may be a distributed control system host running application programs to facilitate sending messages to field devices 20a-20i, and receiving and analyzing data contained in messages from field devices 20a-20i. Host computer 12 may use, for example, AMS™ Device Manager as an application program to allow users to monitor and interact with field devices 20a-20i.

Gateway 18 can communicate with host computer 12 over network 14 using a number of different communication protocols. In one embodiment, network 14 is an RS485 two wire communication link, on which gateway 18 may communicate with host computer 12 using the MODBUS protocol. In another embodiment, network 14 is an Ethernet network, and communication over network 14 can support MODBUS TCP/IP using an Ethernet interface.

Gateway 18 may also serve as a web server (or may have an associated web server), to allow users on network 14 to access field devices 20a-20i of wireless network 16 and to process data. The web server allows gateway 18 to be configured using a computer with a standard web browser and a secure Ethernet connection to network 14. User configurable monitoring pages generated by gateway 18 allow measured values from field devices 20a-20i to be grouped and easily viewed with a web interface. The web page generated by gateway 18 can be viewed by accessing network 14 through host computer 12, or another computer or network device (such as computer 32) connected to network 14. An example of a suitable device to perform the functions of gateway 18 is the Rosemount 1420 wireless gateway from Rosemount Inc. In other embodiments, information may be provided through GUIs in other formats, without the need for a web browser and web server.

System 10 can make use of field devices that have been designed for and used in wired distributed control systems, as well as field devices that are specially designed as wireless transmitters for use in wireless mesh networks. Examples of wireless transmitters include the Rosemount 3051S wireless level transmitter, Rosemount 648 wireless temperature transmitter, and Rosemount 3051S wireless pressure transmitters from Rosemount Inc. These wireless transmitters are also capable of use in wired systems.

Wireless network 16 is preferably a low power network in which many of the nodes are powered by long life batteries or low power energy scavenging power sources. Communication over wireless network 16 may be provided according to a mesh network configuration, in which messages are transmitted from node-to-node through network 16. This allows the use of lower power RF radios, while allowing the network 16 to span a significant physical area to deliver messages from one end of the network to the other.

In a wired control/monitoring system, interaction between the host computer and the field devices occurs using well known control messages according to a control system communication protocol such as HART, Foundation Fieldbus, Profibus, or the like. Field devices capable of use in both wired systems and wireless systems can make use of control messages according to one of the known control message protocols. In some cases, wireless field devices 20a-20i, which are part of wireless network 16, may not be able to directly exchange these well known control messages with host computer 12 because the wireless communication over network 16 occurs according to a wireless protocol that is general purpose in nature.

Rather than require host computer 12 and field devices 20a-20i to communicate using wireless protocol, a method can be provided to allow sending and receiving well known field device control messages between host computer 12 and field devices 20a-20i over wireless network 16. The well known field device control messages can be embedded into the general purpose wireless protocol so that the control messages can be exchanged between host computer 12 and field devices 20a-20i to achieve control of an interaction with field devices 20a-20i. As a result, wireless network 16 and its wireless communication protocol is essentially transparent to host computer 12 and field devices 20a-20i. The HART protocol is an example of a known control system communication protocol, although other protocols (e.g. Foundation Fieldbus, Profibus, etc.) can be used as well.

A similar issue relates to the addresses used by host computer 12 to direct messages to field devices 20a-20i. In wired systems, the host computer addresses each field device with a unique field device address. The address is defined as part of the particular communication protocol being used, and typically forms a part of control messages sent by the host computer to the field devices.

When a wireless network, such as network 16 shown in FIG. 1, is used to route messages from the host computer to field devices, the field device addresses used by the host computer may not be compatible with the wireless addresses used by the communication protocol of the wireless network.

One way to deal with addresses is to require host computer 12 to use wireless addresses rather than field device addresses. This approach, however, requires host computer 12 to be programmed differently depending upon whether it is communicating over wired communication links with field devices, or whether it is communicating at least in part over a wireless network. In addition, there remains the issue of multiple field devices, which will typically have different purposes, and which need to be addressed individually.

An alternative approach uses gateway 18 to translate field device addresses provided by host computer 12 into corresponding wireless addresses. A wireless message is sent to the wireless address, and also includes a field device address so that the node receiving the message can direct the message to the appropriate field device. By translating field device addresses to corresponding wireless addresses, host computer 12 can function in its native field address domain when interacting with field devices.

In one embodiment, host computer 12 communicates with gateway 18 using messages in extendable markup language (XML) format. Control messages intended for field devices 20a-20i may presented according to the HART protocol, and are communicated to gateway 18 in XML format.

In one embodiment, gateway 18 includes a gateway interface, a network (or mesh) manager, and a radio transceiver. The gateway interface receives the XML document from host computer 12, extracts the HART control message, and modifies the control message into a format to be embedded in a wireless message that will be transmitted over wireless network 16.

The network or mesh manager forms the wireless message with the HART control message embedded, and with the wireless address of the node corresponding to the field device to which the HART message is directed. The mesh manager may be maintaining, for example, a lookup table that correlates each field device address with the wireless address of the node at which the field device corresponding to that field device address is located. The wireless message according to the wireless protocol includes the wireless node address, which is used to route the wireless message through network 16. The field device address is contained in the HART message embedded within the wireless message, and is not used for routing the wireless message through network 16. Instead, the field device address is used once the wireless message has reached the intended node.

The mesh manager causes the radio in gateway 18 to transmit the wireless message, so that it will be transmitted by one or multiple hops within network 16 to the intended field device. For example, the message to field device 20f may be transmitted from gateway 18 to field device 20a and then to field device 20f, or alternatively from gateway 18 to field device 20b and then to field device 20f. Other routes are also possible in network 16.

The use of embedded control messages (in a control message protocol) within wireless messages (in a wireless protocol) enables the host computer of a distributed control system to interact with field devices through a wireless communication network. Control messages can be exchanged between the host computer and the field devices using known control message formats, such as HART, Fieldbus, or the like, without having to be modified by either the host computer or the field devices to accommodate transmission of the control messages over the wireless network. The control message is embedded within the wireless communication protocol such that the substance of the control message exchanged between the host computer and the field device is unmodified as a result of having passed through the wireless network.

Control messages that are too large to be routed through the wireless communication protocol can be broken into parts and sent as multiple parts. Each part is embedded in a wireless message, and the multiple parts can be reassembled into the original control message as the multiple parts exit the wireless network. By use of a message ID in the embedded control message, the multiple parts can be reassembled in proper order, even though individual wireless messages having embedded parts of the original control message may take different paths through the wireless network.

The translation of field device addresses to corresponding wireless addresses allows host 12 to function in its native field device address domain, while interacting with field devices within the wireless address domain. The use of wireless network 16 to route messages to and from the field devices is transparent to host 12. The address translation and inclusion of both the wireless address and the field device address in the wireless message allows multiple field devices associated with a single node (i.e. a single wireless address) to be addressed individually.

Figure 2A:
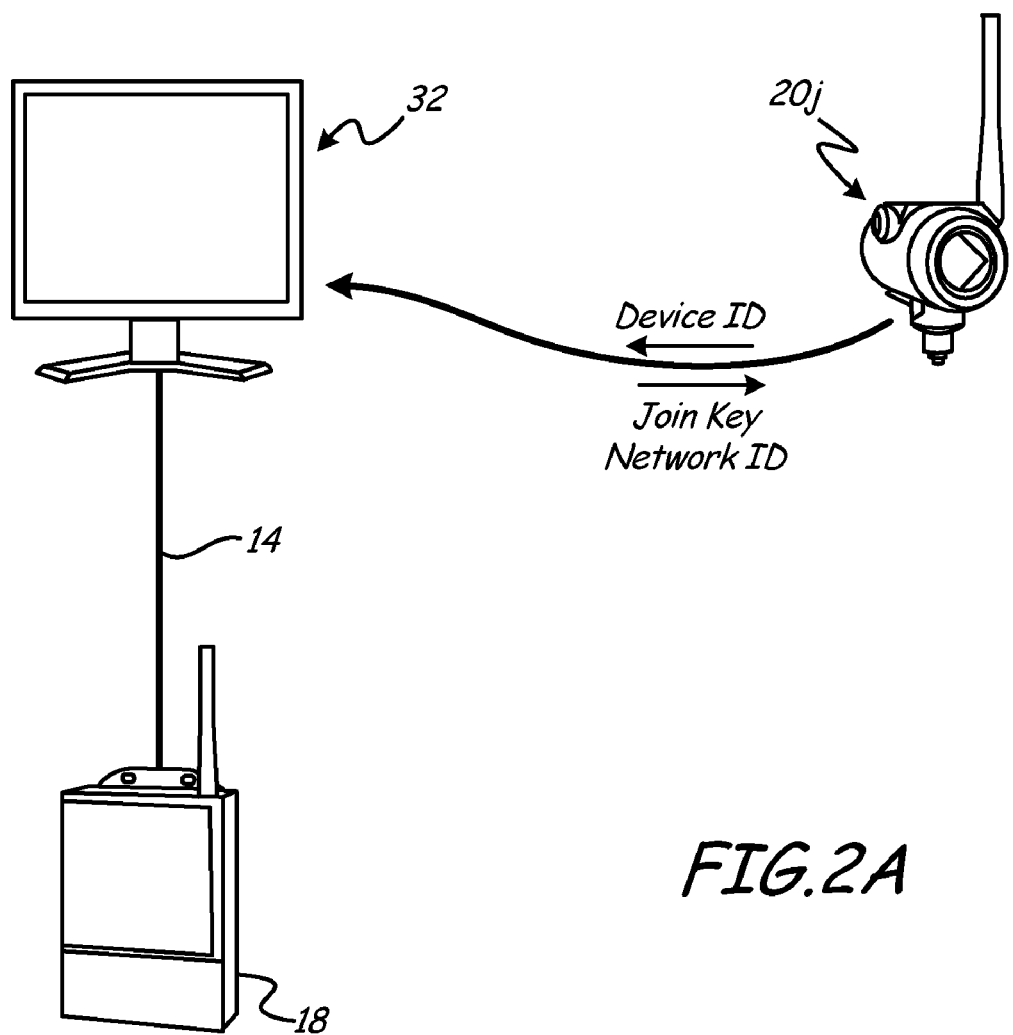
FIGS. 2A and 2B illustrate a method of provisioning a wireless device of the network of FIG. 1 with a join key by connecting the wireless device to a network computer in communication with a wireless gateway.
Figure 2B:
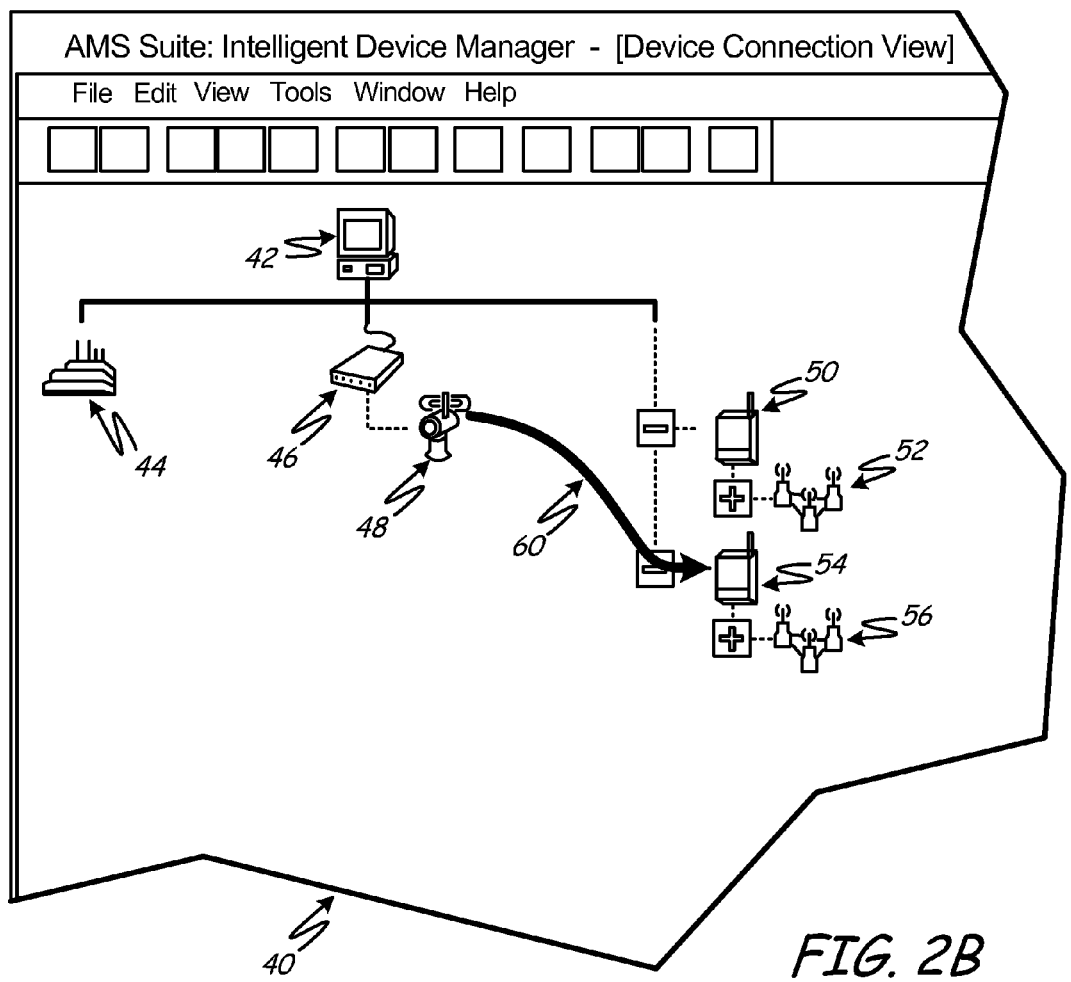

FIGS. 2A and 2B show the provisioning of new field device 20j using network computer 32 and gateway 18. As shown in FIG. 2A, field device 20j is connected to network computer 32 during the provisioning process. This connection may be made through a HART modem within network computer 32. The connection may be made via a USB port or a serial data port. Network computer 32 may be running an application program, such as AMS™ Suite from Emerson Process Management as an application program to allow users to monitor and interact with gateway 18 and the devices of wireless network 16.

FIG. 2B shows a portion of a graphical user interface (GUI) showing a diagram that is displayed when device 20j is connected to network computer 32. GUI 40 provides a diagram with icons representing various components. The icons include device manager icon 42, plant database icon 44, HART modem icon 46, field device icon 48 (representing connected field device 20j of FIG. 2A), gateway icon 50, wireless network icon 52, gateway icon 54, and network icon 56. In this diagram, field device icon 48 corresponds to wireless field device 20j. Gateway icon 54 corresponds to gateway 18, and wireless network icon 56 corresponds to wireless network 16. In this embodiment (as well as the embodiments described with respect to FIGS. 3A-6D) the network manager resides on the gateway device. In other embodiments, the network manager may reside in a host computer 12, server, or other network device. In these embodiments, the network manager would reside above the gateway (i.e., on the high-speed network side) and the gateway would function simply as a routing or collection point.

FIG. 2B illustrates how an association is made between gateway 18 and wireless field device 20j. The association is made by a drag and drop step in which the user (typically a technician) clicks on field device icon 48, drags icon 48 over to gateway icon 54, as shown by arrow 60, and drops icon 48 at gateway 54. This action creates an association between wireless device 20j and gateway 18. The two devices then exchange information needed to allow wireless device 20j to join wireless network 16 (and in particular gateway 18 of wireless network 16).

When wireless field device 20j is connected to network computer 32, network computer 32 interrogates wireless device 20j and receives a device ID, which is a unique identifier of wireless device 20j. When the user drags and drops icon 48 on icon 54 to establish an association between wireless device 20j and gateway 18, network computer 32 obtains the join key and network ID needed by wireless device 20j to join wireless network 16 and communicate with gateway 18. The join key and network ID are transferred to wireless device 20j. The connection between network computer 32 and wireless device 20j can then be removed, and wireless device 20j can be transported to the field for installation. Once installed, wireless device 20j can begin the joining process to join wireless network 16, by using the network ID and the join key that it received during the provisioning process.

When wireless device 20j begins communicating with nearby devices of network 16, it provides its device ID, and makes use of the join key and network ID. The device ID of wireless device 20j has already been received and associated with gateway 18 during the provisioning process, and therefore wireless device 20j will be allowed to join network 16.

The process shown in FIGS. 2A and 2B can be used whether common join keys are used for all devices that join network 16, or whether individual join keys are assigned to individual wireless devices. In either case, a record can be maintained by network computer 32 or gateway 18, or both, documenting which wireless devices are associated with gateway 18 and are permitted to join wireless network 16. In addition, the particular join key used by each wireless device is also stored.

Figure 3A:
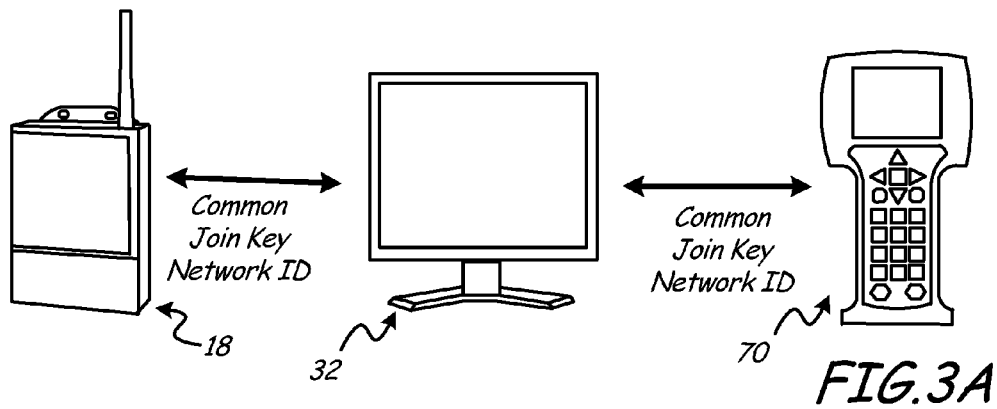
FIGS. 3A-3D show loading common join keys and a network ID into a wireless device using a handheld device.

FIGS. 3A-3D illustrate a method of provisioning wireless device 20j with the assistance of handheld communicator 70. In FIG. 3A, gateway 18, network computer 32, and handheld communicator 70 are shown. Network computer 32 acts as an interface between gateway 18 and handheld communicator 70 to supply a common join key and a network ID.

Figure 3B:
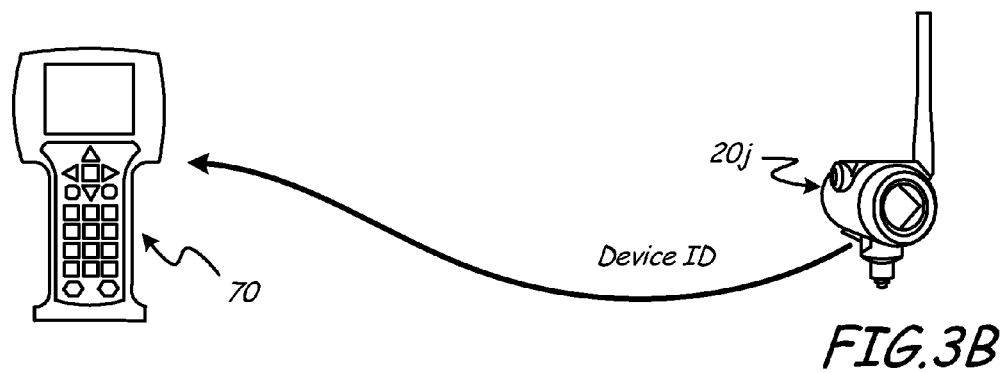

In FIG. 3B, handheld communicator 70 has been connected to wireless device 20j. Connection of handheld communication 70 to wireless device 20j may be a wired connection or wireless connection. In response to interrogation from communicator 70, wireless device 20j provides its device ID, which is stored in handheld communicator 70.

Figure 3C:
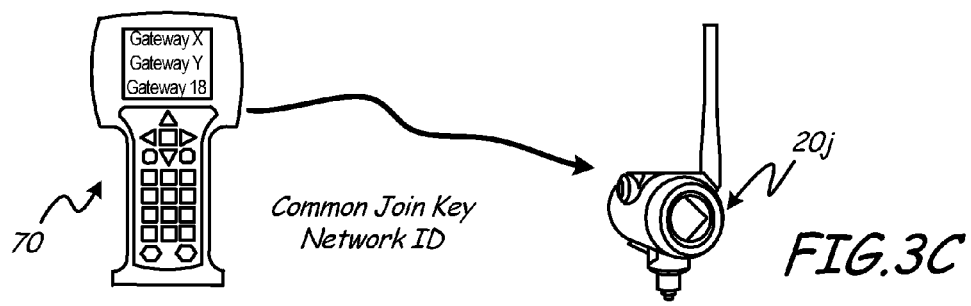

As shown in FIG. 3C, the user then selects a gateway from among a list of gateways that may reside on the same wireless network, or on different wireless networks. Handheld communicator 70 stores a common join key and network ID for each of the gateways that can be selected. When the gateway is selected, handheld communicator 70 associates the device ID of wireless device 20j with the selected gateway. It then transmits the common join key and network ID of the selected gateway to wireless device 20j.

The steps shown in FIGS. 3B and 3C can take place in the field, where wireless device 20j may already be installed. Alternatively, handheld communicator 70 can be used to create an association between wireless device 20j and gateway 18 and provide the common join key and network ID information prior to the installation of wireless device 20j.

Figure 3D:
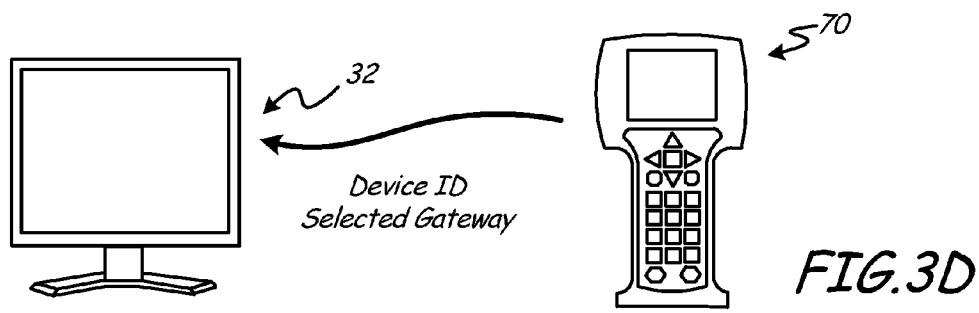

In FIG. 3D, handheld communicator 70 is once again in communication with network computer 32. Handheld communicator 70 provides the device ID and the selected gateway for each wireless device that it has provisioned. The association of wireless devices and gateways may be stored in the database used by network computer 32, and may also be provided to the appropriate gateway, such as gateway 18.

Figure 4A:
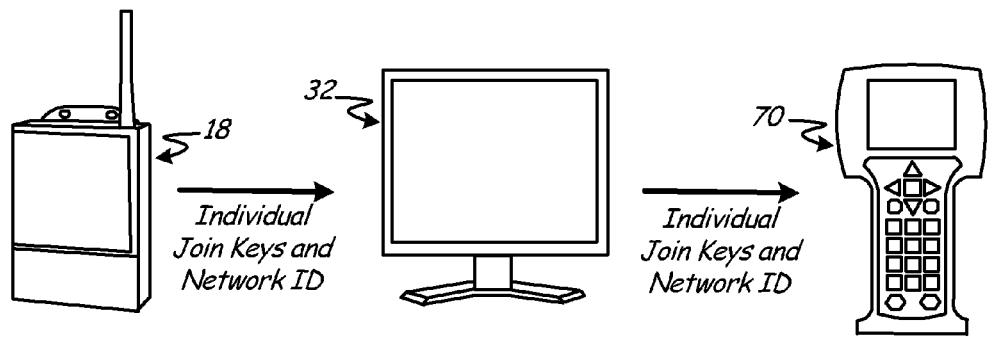
FIGS. 4A-4D show a method of loading individual join keys into wireless devices using a handheld device.

FIGS. 4A-4D show a provisioning process using handheld communicator 70 in which individual join keys are used. In FIG. 4A, handheld communicator 70 is in communication with network computer 32. Handheld communicator 70 requests that it be provided with individual join keys that can be used by wireless devices that are provisioned to join network 16. The individual join keys together with the network ID are provided from gateway 18 to handheld communicator 70 by network computer 32.

Figure 4B:
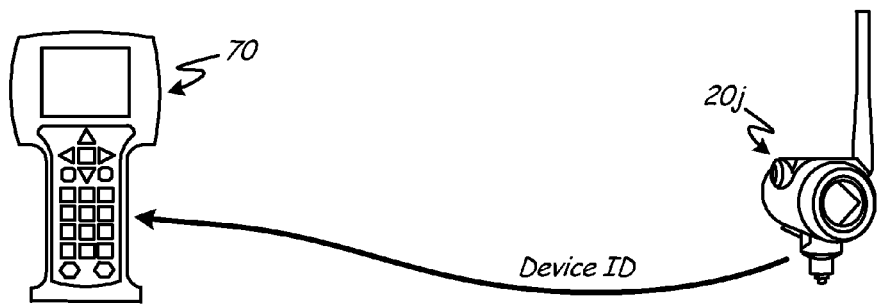

In FIG. 4B, handheld communicator 70 is connected to wireless device 20j. In response to interrogation from handheld communicator 70, wireless device 20j provides a device ID uniquely identifying wireless device 20j.

Figure 4C:
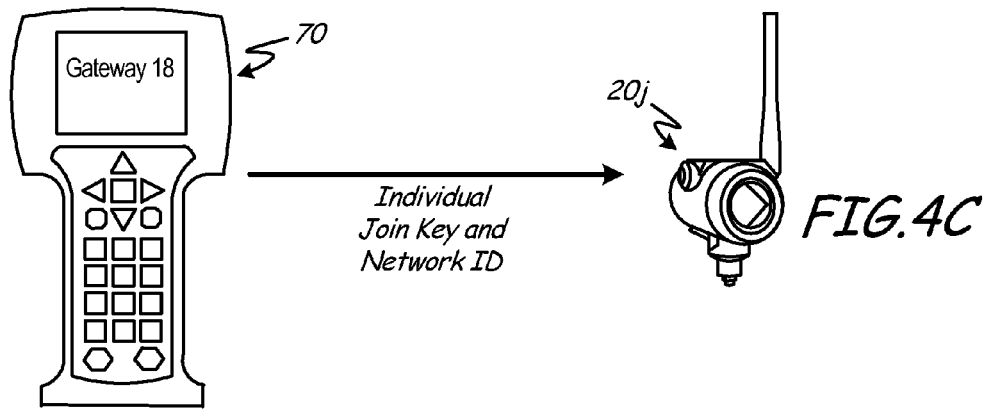

In FIG. 4C, the user has selected a particular gateway (in this case gateway 18) of wireless network 16. Handheld communicator 70 associates the device ID of wireless device 20j with the selected gateway 18, and downloads one of the individual join keys as well as the network ID to wireless device 20j.

The process shown in FIGS. 4B and 4C may be repeated numerous times as handheld communicator 70 is used to provision different wireless devices. At that point, handheld communicator 70 has a stored relationship between each wireless device that it has provisioned and a particular network and gateway. That association includes the particular individual join key provided to each of the wireless devices that have been provisioned.

Figure 4D:
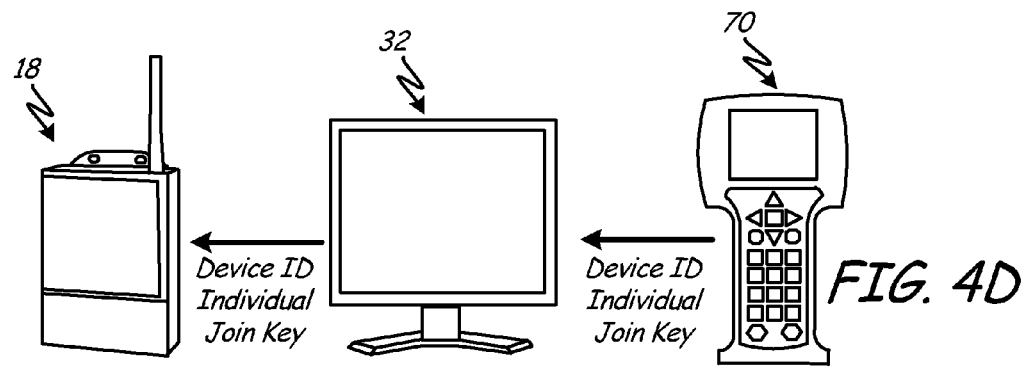

In FIG. 4D, handheld communicator 70 reestablishes contact with network computer 32, so that it can download to computer 32 and gateway 18 the device ID and associated individual join key for each wireless device that has been associated with gateway 18 during the provisioning process. The information from handheld communicator 70 populates a gateway "white list" through the AMS Suite application program. As a result, gateway 18 has access to a list identifying each individual wireless device of wireless network 16, and the individual join key to be used by the individual wireless device in joining network 16.

Figure 5A:
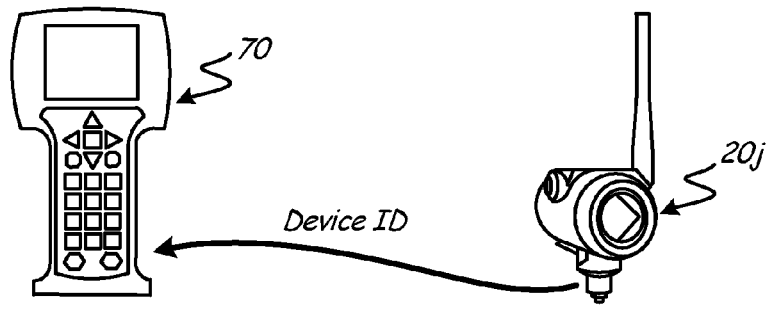
FIGS. 5A-5C show a method of loading individual join keys into wireless devices, where a handheld device randomly generates the individual join keys.
Figure 5B:
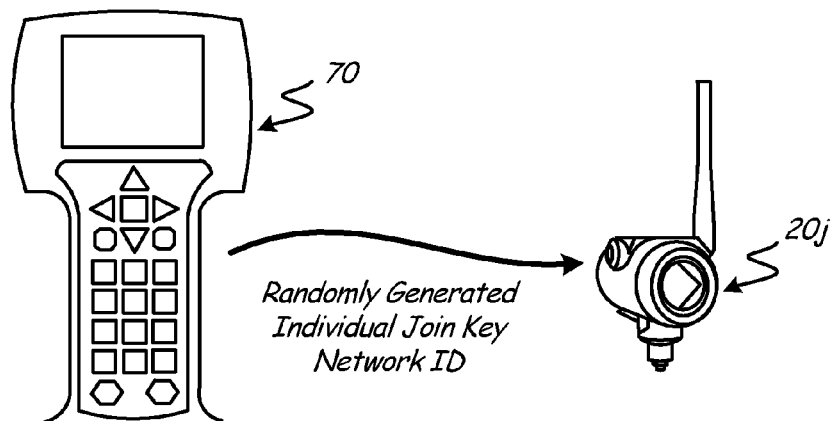
Figure 5C:
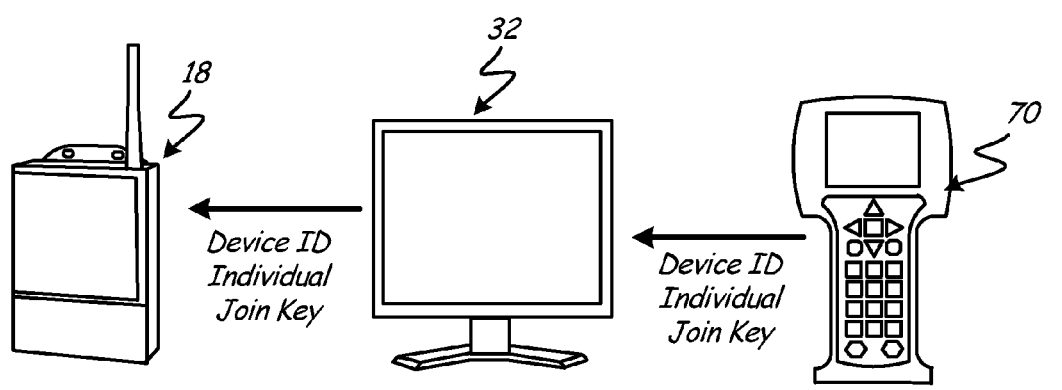

FIGS. 5A-5C show a method of provisioning wireless devices in which handheld communicator 70 randomly generates an individual join key for each wireless device. In FIG. 5A, handheld communicator 70 is connected to wireless device 20j. In response interrogation by communicator 70, wireless device 20j provides a device ID.

In FIG. 5B, the user has selected a particular wireless network and gateway for wireless device 20j. Handheld communicator 70 provides a randomly generated individual join key together with the network ID for network 16 to wireless device 20j. It also stores the randomly generated individual join key in conjunction with the device ID of wireless device 20j and the particular gateway with which wireless device 20j is associated.

In FIG. 5C, handheld communicator 70 is in communication with network computer 32. Communicator 70 provides the device ID and individual join key for each wireless device that it has provisioned. The device ID and individual join keys for devices associated with wireless gateway 18 are provided to gateway 18 by network computer network 32. This allows gateway 18 to populate the gateway white list used to authorize the joining of network 16 by wireless devices.

Figure 6A:
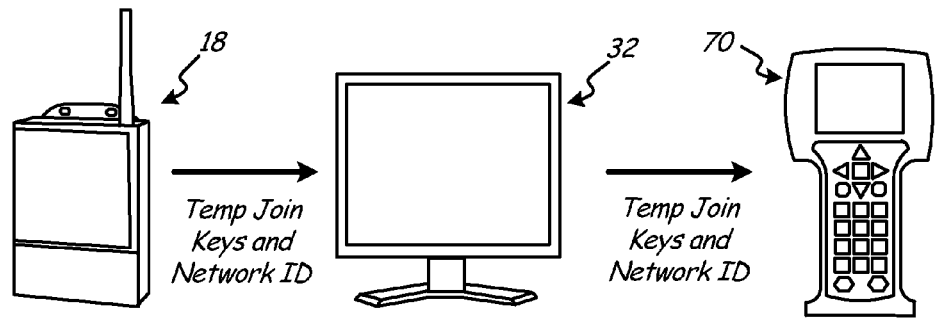
FIGS. 6A-6D show loading temporary join keys into field devices, which are subject to subsequent user authorization.

FIGS. 6A-6D show a method of provisioning a wireless device using temporary join keys generated by gateway 18. In FIG. 6A, handheld communicator 70 is in communication network computer 32. In one embodiment, temporary join keys and a network ID are loaded from gateway 18 to handheld communicator 70 by network computer 32.

Figure 6B:
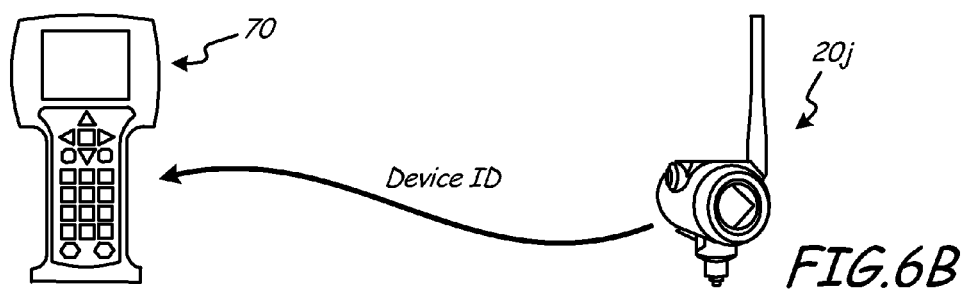

In FIG. 6B, handheld communicator 70 has been connected to wireless device 20j. In response to interrogation by handheld communicator 70, wireless device 20j has provided its device ID.

Figure 6C:
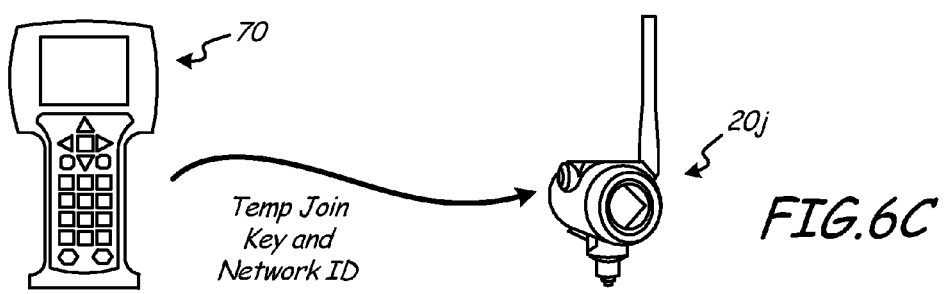
Figure 6D:
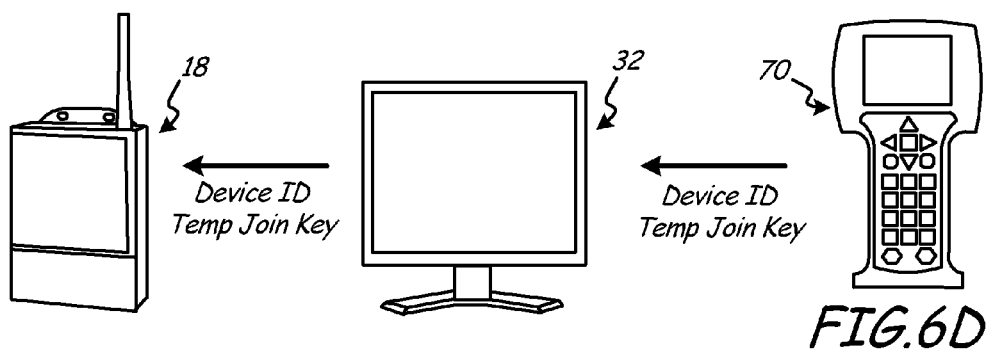

In FIG. 6C, a user has selected a particular network and gateway for wireless device 20j. In this example, gateway 18 has been selected. Handheld communicator 70 associates the device ID for device 20j with gateway 18, and one of the temporary join keys. Communicator 70 then loads the temporary join key and the network ID for gateway 18 into wireless device 20j.

Use of temporary join keys allows a user to later accept or reject devices trying to join the network with temporary join keys. Handheld communicator 70 reestablishes communication with network computer 32 and downloads device ID and temporary join key information for each wireless device that it has provisioned. Network computer 32 provides that information, in turn, to gateway 18.

Later, when a new device, such as wireless device 20j, attempts to join network 16, a user at network computer 32 may decide whether to accept or reject that device. The user may view the graphical user interface to obtain information regarding the device attempting to join network 16 in order to make a decision as to whether to accept that device on the network on a permanent rather than temporary basis.

In another embodiment, handheld communicator 70 randomly generates temporary join keys (as opposed to gateway 18) and loads the temporary join key and network ID for the gateway onto device 20j. Communicator 70 communicates the temporary join keys the device ID of the wireless device that is has provisioned to the gateway device via network computer 32. At a later time, a user could then make a decision as to whether to accept that device on the network on a permanent rather than temporary bases While the invention has been described with reference to an exemplary embodiment(s), it will be understood by those skilled in the art that various changes may be made and equivalents may be substituted for elements thereof without departing from the scope of the invention. For example, in embodiments described with respect to FIGS. 2A-6D the network security manager is implemented as an application program running on the gateway device. In other embodiments, a network manager may reside on a computer, server or other control system connected to the mesh network. Gateway devices would operate only in the capacity of a routing point for the network, but would not be responsible for provisioning new wireless devices. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of provisioning a wireless device to join a wireless mesh network, the method comprising:
   creating an association of a device ID that uniquely identifies the wireless device with a network manager of the wireless mesh network;
   generating a join key, and storing the join key and a network ID on a handheld device without revealing the join key to a human user; and
   providing the join key and the network ID from the handheld device to the wireless device through a secure data communication, without revealing the join key to a human user;
   wherein the human user at no point has access to the join key.

2. The method of claim 1, wherein creating an association comprises:
   connecting the wireless device to the handheld device;
   transferring the device ID from the wireless device to the handheld device;
   connecting the wireless device to the network manager;
   transferring the device ID from the handheld device to the network manager; and
   selecting a network manager, gateway, or wireless network with which the device ID of the wireless device is associated.

3. The method of claim 1, wherein creating an association comprises
   connecting the wireless device to the handheld device;
   transferring the device ID from the wireless devices to the handheld device; and
   selecting through the handheld communicator a network manager, gateway, or wireless network with which the device ID of the wireless device is associated.

4. The method of claim 3, wherein the handheld communicator automatically retrieves or generates the join key, and provides the join key and network ID to the wireless device.

5. The method of claim 4, wherein the join key is a common join key received by the handheld communicator from the network manager associated with the network manager, gateway, or wireless network selected.

6. The method of claim 4, wherein the join key is an individual join key received by the handheld communicator from the network manager associated with the network manager, gateway, or wireless network selected.

7. The method of claim 4, wherein the join key is an individual join key randomly generated by the handheld communicator.

8. The method of claim 4, wherein the join key is a temporary join key received by the handheld communicator from the network manager associated with the network manager, gateway, or wireless network selected.

9. The method of claim 4 and further comprising:
communicating the device ID of the wireless device and the join key provided to the wireless device from the handheld communicator to the network manager.

10. The method of claim 1, wherein the network manager resides on a gateway device of the wireless mesh network.

11. A method of provisioning a wireless device to join a wireless network, the method comprising:
querying the wireless device for a device ID that uniquely identifies the wireless device, and storing the device ID on a handheld device;
selecting at the handheld device a gateway of the wireless network that the wireless device is to join;
automatically retrieving or generating a network ID and randomly generating a join key at the handheld device without revealing the join key to a human user;
providing the join key and the network ID from the handheld device to the wireless device by secure data communication, without revealing the join key to a human user;
associating the device ID with the join key provided; and
communicating the device ID and associated join key from the handheld device to the gateway selected.

12. The method of claim 11, wherein the join key comprises one of a common join key, an individual join key, and a temporary join key.

13. The method of claim 11, wherein the human user at no point has access to the join key.

14. The method of claim 11 and further comprising:
connecting the wireless device to a network computer in communication with the gateway.

15. The method of claim 14, wherein the network computer obtains the device ID and the join key from the handheld device.

16. A method of provisioning a wireless device to join a wireless mesh network, the method comprising:
loading a network ID onto a handheld device;
generating a join key, and storing the join key on the handheld device without revealing the join key to a human user;
querying the wireless device for a device ID with the handheld device, and storing the device ID on the handheld device;
transmitting the network ID and the join key from the handheld device to the wireless device via secure data communication, without revealing the join key to a human user; and
transmitting the device ID from the handheld device to a network server;
wherein the human user at no point has access to the join key.

17. The method of claim 1, wherein generating a join key comprises randomly generating a join key at the handheld device, and further comprising transmitting the join key from the handheld device to the network server without revealing the join key to a human user.

18. The method of claim 1, wherein generating a join key comprises generating a join key at the network server, and storing the join key on the handheld device comprises transmitting the join key from the network server to the handheld device via secure data communication, and loading the join key in memory on the handheld device.

* * * * *